United States Patent [19]

Matsui et al.

[11] Patent Number: 5,747,132
[45] Date of Patent: May 5, 1998

[54] AUTOMOBILE PAINT FILM-PROTECTIVE SHEET

[75] Inventors: Komaharu Matsui; Mitrso Wakimoto; Takeshi Eda; Tadayoshi Tatsuno, all of Kanagawa; Yutaka Kuwabara; Kenichi Shibata, both of Osaka, all of Japan

[73] Assignees: Kansai Paint Co., Ltd., Hyogo; Nitto Denko Corporation, Osaka, both of Japan

[21] Appl. No.: 368,401

[22] Filed: Jan. 3, 1995

Related U.S. Application Data

[63] Continuation of Ser. No. 900,293, Jun. 18, 1992, abandoned.

[30] Foreign Application Priority Data

| Jun. 19, 1991 | [JP] | Japan | 3-174617 |
| Oct. 18, 1991 | [JP] | Japan | 3-299954 |
| Oct. 18, 1991 | [JP] | Japan | 3-299955 |
| May 19, 1992 | [JP] | Japan | 4-152717 |

[51] Int. Cl.$^6$ .................................................. B32B 7/06
[52] U.S. Cl. .................. 428/41.7; 428/355 RA; 428/355 EN; 430/961; 156/344; 150/166
[58] Field of Search ................. 428/343, 41.7, 428/355 RA, 355 EN; 525/93, 227, 316; 430/961; 156/344; 150/166

[56] References Cited

U.S. PATENT DOCUMENTS

| 2,463,452 | 3/1949 | Yule. | |
| 3,372,049 | 3/1968 | Schaffhausen | 428/343 |
| 4,151,319 | 4/1979 | Sackoff et al. | 428/355 X |
| 4,346,189 | 8/1982 | Laurent | 428/355 X |
| 4,751,121 | 6/1988 | Kühnel et al. | 428/355 X |
| 4,797,322 | 1/1989 | Huddlesten et al. | 428/355 |
| 4,914,155 | 4/1990 | Shimomuro et al. | 525/88 X |
| 5,085,364 | 2/1992 | Ishikawa et al. | 228/139 |
| 5,127,974 | 7/1992 | Tomiyama | 156/85 |

FOREIGN PATENT DOCUMENTS

| 0104005 | 3/1984 | European Pat. Off. . |
| 2003891 | 3/1979 | United Kingdom . |

OTHER PUBLICATIONS

European Search Report, dated Mar. 18, 1993.

Database WPIL, Section Ch, Week 9145, Jan. 15, 1992, 91-329768, Abstract, JP-A-3 221 169.

Database WPIL, Section Ch, Week 8704, Mar. 25, 1987, 87-025165, Abstrat, JP-A-61 281 163.

*Primary Examiner*—James J. Bell
*Assistant Examiner*—Blaine Copenheaver
*Attorney, Agent, or Firm*—Sughrue, Mion, Zinn, Macpeak & Seas, PLLC

[57] ABSTRACT

An automobile paint film-protective sheet comprising a substrate having formed on one side thereof a rubber-based pressure-sensitive adhesive having a dynamic modulus of from $2\times10^5$ to $7\times10^6$ dyne/cm$^2$ at 60° C.

4 Claims, 1 Drawing Sheet

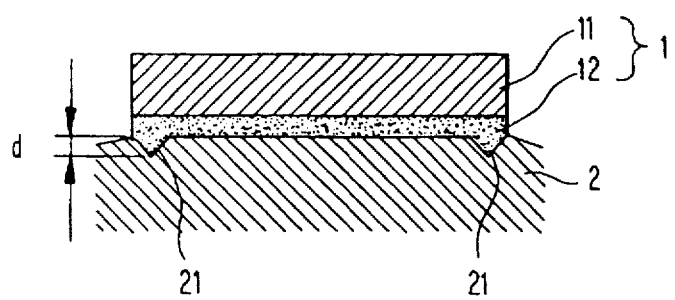

AUTOMOBILE PAINT FILM-PROTECTIVE SHEET

This is a continuation of application Ser. No. 07/900,293 filed Jun. 18, 1992 now abandoned.

FIELD OF THE INVENTION

The present invention relates to an automobile paint film-protective sheet which is hard to cause a paint film deformation and suitable for use in the surface protection of automotive bodies and other parts.

BACKGROUND OF THE INVENTION

An effective measure is desired to prevent automobile paint films from suffering damages, dulling, discoloration, and other defects due to various suspended or impinging matters such as dust particles and raindrops. Such paint film protection is necessary, for example, in the case of loading painted automobiles or automotive parts into trucks or ships and transporting these to remote places such as overseas.

A method of covering painted automobiles or automotive parts with a 5–20 μm-thick coating comprising a wax has been known as a measure for such paint film protection. However, this method has had, for example, the following various problems. It is difficult to form a wax coating at a uniform thickness, so that uniform protection of the paint film cannot be obtained; wax coatings are prone to be fouled and have poor resistance to acid rain; part of the wax may penetrate into the paint film to cause discoloration or other defects; formation of a wax coating and removal thereof require much labor; and use of solvents and treatment of waste liquids are apt to lead to environmental problems.

On the other hand, various kinds of surface-protective sheets are known which comprise a substrate and a pressure-sensitive adhesive layer formed thereon. Of these, a protective sheet comprising a radiation-curable pressure-sensitive adhesive layer having a lowered glass transition point has been proposed for use on adherends having a paint film (JP-A-2-199184). (The term "JP-A" as used herein means an "unexamined published Japanese patent application".)

The above surface-protective sheet, however, has been defective in that preparation of a radiation-curable pressure-sensitive adhesive used to form the pressure-sensitive adhesive layer requires a complicated and special technique. In addition, the protective sheet has had other problems that the pressure-sensitive adhesive layer obtained shows poor adhesion strength and that the pressure-sensitive adhesive layer has poor heat resistance, probably because the adhesive layer has been made to have a lowered glass transition point to impart a particular performance required in paint film-protective sheets, i.e., preventing the deformation of the paint film. Due to such a pressure-sensitive adhesive layer, application of the protective sheet to automobiles has had a problem that the adhesion strength of the sheet applied to an automobile increases with increasing temperature during outdoor transportation, etc., making stripping of the sheet difficult. Thus, the proposed surface-protective sheet has been unsatisfactory in basic performance.

SUMMARY OF THE INVENTION

An object of the present invention is to provide an automobile paint film-protective sheet which has an excellent ability to maintain the initial adhesion strength thereof even when exposed to temperature-rising conditions due to, for example, outdoor transportation of automobiles covered with the protective sheet, which retains an excellent balance between protective properties due to good adhesion and strippability over a long period of time, and which is hard to cause the paint film covered with the sheet to suffer a deformation, such as formation of a gap as illustrated in the FIGURE. The FIGURE illustrates minute deformations 21 formed in an automobile paint film 2 near the boundaries between the area to which a paint film-protective sheet 1 comprising a substrate 11 and a pressure-sensitive adhesive layer 12 is bonded and the area not covered with the protective sheet 1. Such minute deformations can usually appear when a paint film-protective sheet is applied to a paint film and allowed to stand for about 10 hours at a temperature slightly lower than the heat distortion temperature of the paint film, and the depth (d) of gaps such as a depression-projection deformation generally is about from 0.1 to 0.5 μm.

The present invention provides an automobile paint film-protective sheet comprising a substrate having formed on one side thereof a rubber-based pressure-sensitive adhesive having a dynamic modulus of from $2\times10^5$ to $7\times10^6$ dyne/cm$^2$ at 60° C.

The present invention further provides an automobile paint film-protective sheet comprising a substrate having formed on one side thereof a pressure-sensitive adhesive layer which is obtained by blending either from 0.005 to 0.5 part by weight of a silicone oil or from 0.01 to 2 parts by weight of an acrylic polymer having a weight-average molecular weight of from 1,000 to 50,000 with 100 parts by weight of a rubber-based pressure-sensitive adhesive.

According to the present invention, by using a rubber-based pressure-sensitive adhesive having a dynamic modulus of from $2\times10^5$ to $7\times10^6$ dyne/cm$^2$ at 60° C., the paint film-protective sheet not only is hard to suffer a change in adhesion strength due to the good heat resistance of the pressure-sensitive adhesive layer even under temperature-rising conditions during outdoor transportation, etc., but also have excellent two basic performances of protective properties due to good adhesion and strippability and retain a good balance between the two basic performances over a long period of time. Further, by blending a silicone oil or an acrylic polymer having a molecular weight in the specific range with a rubber-based pressure-sensitive adhesive, the adhesion strength of the pressure-sensitive adhesive to paint films can be reduced and regulated in a proper range. Due to this and because of the good heat resistance of the rubber-based pressure-sensitive adhesive used, the adhesion strength of the protective sheet applied to painted automobiles or automotive parts is effectively prevented from increasing even when the protective sheet is exposed to temperature-rising conditions due to outdoor transportation or by other factors. As a result, adhesive remaining and paint film deformations such as gap formation, particularly at the edge parts of the protective sheet, can be avoided; such troubles and defects have been involved by the use of conventional protective sheets due to differences in expansion and contraction degree between the paint film and the protective sheet with changing temperature.

BRIEF DESCRIPTION OF THE DRAWING

The FIGURE is a sectional view showing minute deformations formed in an automobile paint film covered with a conventional paint film-protective sheet.

DETAILED DESCRIPTION OF THE INVENTION

The automobile paint film-protective sheet of the present invention comprises a substrate having formed on one side thereof a rubber-based pressure-sensitive adhesive layer which may contain a silicone oil or a low molecular weight acrylic polymer, if required and necessary. The adhesion strength of the protective sheet to automobile paint films preferably is from 100 to 1,000 g/20 mm, and preferably from 130 to 700 g/20 mm. If the protective sheet has an adhesion strength outside the above range, there are cases where the protective sheet applied on an automobile peels off the adherend during transportation of the automobile or the protective sheet cannot be stripped smoothly after transportation of the sheet-covered automobile.

The rubber-based pressure-sensitive adhesive used in the present invention needs not be of a curable type. It is, however, preferred that the pressure-sensitive adhesive has a dynamic modulus of from $10^5$ to $10^7$ dyne/cm$^2$ at 60° C. from the standpoint of preventing adhesive remaining or paint film deformations such as gap formation, from occurring at the edge parts of the protective sheet due to its changes such as expansion and contraction with changing temperature. In particular, in the case of neither a silicone oil nor a low molecular weight acrylic polymer is blended, it is necessary for the rubber-based pressure-sensitive adhesive to have a dynamic modulus of from $2 \times 10^5$ to $7 \times 10^6$ dyne/cm$^2$ at 60° C.

Preferred examples of the rubber-based pressure-sensitive adhesive include those comprising a rubber-type polymer such as natural rubber, polyisobutylene, an A-B-A type block polymer, or the like, and optionally a tackifier or a softener which imparts the desired dynamic modulus. The rubber-based pressure-sensitive adhesive may contain suitable fillers and additives such as a pigment, anti-oxidant, and stabilizer.

From the standpoints of preventing the adhesive strength from increasing with the lapse of time and avoiding adhesive remaining, minute deformations of the paint film, etc., it is particularly preferred to use a rubber-based pressure-sensitive adhesive having an SP value which is different from that of the paint film by 1 or more, especially 1.5 or more. From the standpoint of stably maintaining the adhesive performance over a long period of time, preferred examples of the rubber-type polymer include isobutylene-based polymers which do not have unsaturated bond and are not curable, and A-B-A type block copolymers comprising a polystyrene block, an ethylene-butylene copolymer block, and a polystyrene block.

As the tackifier and softener, suitable materials may be used, but materials having good compatibility with the rubber-type polymer are preferred. Generally employed tackifiers include hydrocarbon resins, alkylphenol resins, and terpene resins. Generally employed softeners include low molecular weight polyisobutylene, in the case where the rubber-type polymer is polyisobutylene, and paraffin oils, in the case where the rubber-type polymer is an A-B-A type block polymer.

If required and necessary, a silicone oil or a low molecular weight acrylic polymer is added to the rubber-based pressure-sensitive adhesive for the purpose of reducing the adhesion strength of the pressure-sensitive adhesive and preventing the adhesion strength from increasing with increasing temperature thereby to make the protective sheet hard to cause a paint film deformation such as gaps. Such adhesive strength control by the addition of a silicone oil or a low molecular weight acrylic polymer is considered to be attributable to migration of the silicone oil or acrylic polymer, both of which show poor adhesion and are thermally inactive, to the surface of the pressure-sensitive adhesive layer (the interface between the pressure-sensitive adhesive layer and the paint film) due to, for example, the poor compatibility of the silicone oil or acrylic polymer with the rubber-based pressure-sensitive adhesive.

Examples of the silicone oil include dimethylpolysiloxane of the following formula [I], methylphenylpolysiloxane of the following formula [II], methylhydrogenpolysiloxane of the following formula [III], or the like. Further, modified silicone oils obtained by incorporating various functional groups into these polysiloxanes to improve solubility in water, compatibility, reactivity, or other properties can also be used. Examples thereof include epoxy-modified silicone oils, alkyl-modified silicone oils, amino-modified silicone oils, carboxyl-modified silicone oils, alcohol-modified silicone oils, fluorine-modified silicone oils, alkyl-aralkyl-polyether-modified silicone oils, epoxy-polyether-modified silicone oils, and polyether-modified silicone oils.

Formula [I]:

$$CH_3-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_x-\underset{\underset{CH_3}{|}}{\overset{\overset{CH_3}{|}}{Si}}-CH_3$$

Formula [II]:

$$CH_3-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_x-\left(\underset{\underset{C_6H_5}{|}}{\overset{\overset{CH_3}{|}}{Si}}-O\right)_y-\underset{\underset{CH_3}{|}}{\overset{\overset{CH_3}{|}}{Si}}-CH_3$$

Formula [III]:

$$CH_3-\underset{\underset{CH_3}{|}}{\overset{\overset{CH_3}{|}}{Si}}-O-\left(\underset{\underset{H}{|}}{\overset{\overset{CH_3}{|}}{Si}}-O\right)_x-\underset{\underset{CH_3}{|}}{\overset{\overset{CH_3}{|}}{Si}}-CH_3$$

Specific examples of the above-described silicone oil include the following materials which all are trade names: SH-200, SH-203, SH-340, SH-3746, SF-8411, SF-8417, SF-8418, SP-8419, SF-8421, SF-8427, FS-1265 (manufactured by Toray Silicone Co., Ltd., Japan), TSF-400, TSF-401, TSF-4300, TSF-4445, TSF-4446, TSF-4452, TSF-4460, TSF-4700 (manufactured by Toshiba Silicone Co., Ltd., Japan), KP-301, KP-310, KP-316, KP-321, KP-322, KP-330, KP-354, and KP-390 (manufactured by Shin-Etsu Chemical Co., Ltd., Japan).

The amount of the silicone oil added is from 0.005 to 0.5 part by weight, preferably 0.01 to 0.2 parts by weight, per 100 parts by weight of the rubber-based pressure-sensitive adhesive. If the amount of the silicone oil added is below 0.005 part by weight, a sufficient effect cannot be produced and the adhesion strength of the pressure-sensitive adhesive is not lowered satisfactorily. If the amount thereof exceeds 0.5 part by weight, there are cases where the adhesion strength of the pressure-sensitive adhesive is reduced excessively.

On the other hand, the acrylic polymer used in the present invention is a polymer having a weight-average molecular weight of from 1,000 to 50,000. Examples thereof include liquid acrylic polymers having a structural unit represented by the following formula:

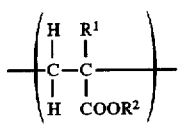

wherein $R^1$ is hydrogen or methyl and $R^2$ is an alkyl group having from 1 to 18 carbon atoms.

Such acrylic polymers can be produced by, for example, polymerizing one or more alkyl esters of acrylic or methacrylic acid having from 1 to 18 carbon atoms in the alkyl moiety, such as ethyl acrylate, n-, i-, or t-butyl acrylate, 2-ethylhexyl acrylate, and 2-ethylhexyl methacrylate, and if required and necessary, other monomer(s), by solution polymerization.

In the present invention, a liquid acrylic polymer having a glass transition point of 0° C. or less is preferably used, which is obtained using, as the major monomer component, a monomer that forms a soft polymer having a glass transition point of from −20° to −65° C. Specific examples of the liquid acrylic polymer include commercially available products such as Modaflow (manufactured by Monsanto Company), Polyflow S, Polyflow No. 9 (both manufactured by Kyoeisha Chemical Co., Ltd., Japan), and Dispalon #1970 (manufactured by Kusumoto Chemicals Ltd., Japan).

The amount of the acrylic polymer added is from 0.01 to 2 parts by weight per 100 parts by weight of the rubber-based pressure-sensitive adhesive. If the amount of the acrylic polymer added is below 0.01 part by weight, a sufficient effect cannot be produced and the adhesion strength of the pressure-sensitive adhesive is not lowered satisfactorily. If the amount thereof exceeds 2 parts by weight, there are cases where the adhesion strength of the pressure-sensitive adhesive is reduced excessively.

The protective sheet of the present invention can be prepared by the conventional method such as a method in which a solution of the pressure-sensitive adhesive in a solvent or a melt of the pressure-sensitive adhesive is coated on a substrate, or a method in which a pressure-sensitive adhesive layer formed on a separator is transferred onto a substrate. The thickness of the pressure-sensitive adhesive layer to be formed can be suitably determined. Generally, however, the thickness is 200 μm or less, and preferably from 5 to 50 μm. If required and necessary, the pressure-sensitive adhesive layer formed on a substrate may be protected by temporarily covering with a separator, etc., until the protective sheet is subjected to practical use.

As the substrate, a suitable material can be used. In general, a plastic film, porous film, paper, nonwoven fabric, or the like is used. The substrate generally has a thickness of 300 μm or less, and preferably from 10 to 100 μm. However, the thickness of the substrate is not limited thereto.

The automobile paint film-protective sheet of the present invention is suitable for use in, for example, the surface protection of automotive bodies or parts covered with a paint film of the melamine-alkyd type, melamine-acrylic type, urethane type or the like, against impingement of minute particles to the adherends and against chemicals and other substances. In particular, the protective sheet can be advantageously applied to automotive bodies or parts which are exposed to temperature-rising conditions due to outdoor transportation or other factors or which are surface-protected over a long period of time.

As described above, the automobile paint film-protective sheet according to the present invention is hard to cause the paint film to suffer deformations such as gaps and is also hard to cause adhesive remaining when the protective sheet is stripped after use. Furthermore, the protective sheet has an excellent ability to maintain its initial adhesion strength even under temperature-rising conditions and retains an excellent balance between protective properties over a long period of time due to good adhesion and strippability.

The present invention will be explained below in more detail by reference to the following examples, but the invention is not construed as being limited thereto. Unless otherwise indicated, all percents, parts, ratios and the like are by weight.

EXAMPLE 1

A toluene solution of a rubber-based pressure-sensitive adhesive comprising a mixture of 50 parts of a polyisobutylene having a viscosity-average molecular weight of 1,200,000 and 50 parts of a polyisobutylene having a viscosity-average molecular weight of 35,000 was coated on a 40 μm-thick film made of a polypropylene/polyethylene blend (weight ratio; 1/9), and then dried at 120° C. for 3 minutes, thereby obtaining a protective sheet having a pressure-sensitive adhesive layer having a dynamic modulus of $1.2 \times 10^6$ dyne/cm² at 60° C. and a thickness of 10 μm. The dynamic modulus was determined by a measurement with a Vibron tester at a frequency of 1 Hz (hereinafter the same).

EXAMPLE 2

A protective sheet was obtained in the same manner as in Example 1 except that a rubber-based pressure-sensitive adhesive comprising a mixture of 25 parts of a polyisobutylene having a viscosity-average molecular weight of 1,200,000 and 75 parts of a polyisobutylene having a viscosity-average molecular weight of 35,000 was used to form a pressure-sensitive adhesive layer having a dynamic modulus of $4 \times 10^5$ dyne/cm² at 60° C.

EXAMPLE 3

A protective sheet was obtained in the same manner as in Example 1 except that a rubber-based pressure-sensitive adhesive consisting of only a polyisobutylene having a viscosity-average molecular weight of 1,200,000 was used to form a pressure-sensitive adhesive layer having a dynamic modulus of $3 \times 10^6$ dyne/cm² at 60° C.

EXAMPLE 4

A protective sheet was obtained in the same manner as in Example 1 except that a rubber-based pressure-sensitive adhesive comprising a mixture of 75 parts of a polyisobutylene having a viscosity-average molecular weight of 1,200,000 and 25 parts of a polyisobutylene having a viscosity-average molecular weight of 35,000 was used to form a pressure-sensitive adhesive layer having a dynamic modulus of $2.8 \times 10^6$ dyne/cm² at 60° C.

EXAMPLE 5

A protective sheet was obtained in the same manner as in Example 1 except that a rubber-based pressure-sensitive adhesive comprising a mixture of 100 parts of an A-B-A type block polymer comprising a polystyrene block, an ethylene-butylene copolymer block, and a polystyrene block (Kraton G-1657, manufactured by Shell Kagaku K.K., Japan), and 40 parts of a hydrogenated petroleum resin (Arcon P-100, manufactured by Arakawa Chemical Industries, Ltd.; hereinafter the same) was used to form a pressure-sensitive adhesive layer having a dynamic modulus of $5 \times 10^6$ dyne/cm² at 60° C.

EXAMPLE 6

A protective sheet was obtained in the same manner as in Example 1 except that a rubber-based pressure-sensitive adhesive comprising a mixture of 100 parts of an A-B-A type block polymer comprising of a polystyrene block, an ethylene-butylene copolymer block, and a polystyrene block (Kraton G-1652), and 40 parts of the hydrogenated petroleum resin was used to form a pressure-sensitive adhesive layer having a dynamic modulus of $6\times10^6$ dyne/cm$^2$ at 60° C.

EXAMPLE 7

A toluene solution of a pressure-sensitive adhesive prepared by adding 0.01 part of a silicone oil (dimethylpolysiloxane; SH-200) to 90 parts of a polyisobutylene having a viscosity-average molecular weight of about 35,000 and a dynamic modulus of $3\times10^5$ dyne/cm$^2$ at 60° C. and 10 parts of a polyisobutylene having a viscosity-average molecular weight of 1,200,000 and a dynamic modulus of $3\times10^6$ dyne/cm$^2$ at 60° C. was coated on a 40 μm-thick film made of a polypropylene/polyethylene blend (weight ratio; 9/1), and then dried at 120° C. for 3 minutes, thereby obtaining a protective sheet having a pressure-sensitive adhesive layer with a thickness of 10 μm.

EXAMPLE 8

A protective sheet was obtained in the same manner as in Example 7 except that the amount of the silicone oil added was changed to 0.3 part.

EXAMPLE 9

A protective sheet was obtained in the same manner as in Example 7 except that a pressure-sensitive adhesive prepared by adding 0.1 part of a silicone oil (alkyl-aralkyl-polyether-modified silicone oil; SF-8419) to 100 parts of a polyisobutylene having a viscosity-average molecular weight of 1,200,000 and a dynamic modulus of $3\times10^6$ dyne/cm$^2$ at 60° C. was used.

EXAMPLE 10

A protective sheet was obtained in the same manner as in Example 9 except that the amount of the silicone oil added was changed to 0.4 part.

EXAMPLE 11

A protective sheet was obtained in the same manner as in Example 7 except that a pressure-sensitive adhesive prepared by adding 0.2 part of a silicone oil (alkyl-modified silicone oil; SH-230) to a rubber-based pressure-sensitive adhesive comprising a mixture of 100 parts of Kraton G-1657 and 40 parts of the hydrogenated petroleum resin and having a dynamic modulus of $5\times10^6$ dyne/cm$^2$ at 60° C. was used.

EXAMPLE 12

A toluene solution of a pressure-sensitive adhesive prepared by adding 0.015 part of an acrylic polymer (Polyflow No. 9) having a weight-average molecular weight of 30,000 to 90 parts of a polyisobutylene having a viscosity-average molecular weight of about 35,000 and a dynamic modulus of $3\times10^5$ dyne/cm$^2$ at 60° C. and 10 parts of a polyisobutylene having a viscosity-average molecular weight of 1,200,000 and a dynamic modulus of $3\times10^6$ dyne/cm$^2$ at 60° C. was coated on a 40μm-thick film made of a polypropylene/polyethylene blend (weight ratio; 1/9) , and then dried at 120° C. for 3 minutes, thereby obtaining a protective sheet having a pressure-sensitive adhesive layer with a thickness of 10μm.

EXAMPLE 13

A protective sheet was obtained in the same manner as in Example 12 except that the amount of the acrylic polymer added was changed to 0.3 part.

EXAMPLE 14

A protective sheet was obtained in the same manner as in Example 12 except that a pressure-sensitive adhesive prepared by adding 0.2 part of an acrylic polymer (Modaflow) having a weight-average molecular weight of 37,000 to 100 parts of a polyisobutylene having a viscosity-average molecular weight of 1,200,000 and a dynamic modulus of $3\times10^6$ dyne/cm$^2$ at 60° C. was used.

EXAMPLE 15

A protective sheet was obtained in the same manner as in Example 14 except that the amount of the acrylic polymer added was changed to 1.5 parts.

EXAMPLE 16

A protective sheet was obtained in the same manner as in Example 12 except that a pressure-sensitive adhesive prepared by adding 0.8 part of the acrylic polymer (Modaflow) to a rubber-based pressure-sensitive adhesive comprising a mixture of 100 parts of Kraton G-1657 and 40 parts of the hydrogenated petroleum resin and having a dynamic modulus of $5\times10^6$ dyne/cm$^2$ at 60° C. was used.

COMPARATIVE EXAMPLE 1

A protective sheet was obtained in the same manner as in Example 1 except that a rubber-based pressure-sensitive adhesive consisting of only a polyisobutylene having a viscosity-average molecular weight of 35,000 was used to form a pressure-sensitive adhesive layer having a dynamic modulus of $1\times10^5$ dyne/cm$^2$ at 60° C.

COMPARATIVE EXAMPLE 2

A protective sheet was obtained in the same manner as in Example 1 except that a rubber-based pressure-sensitive adhesive consisting of Kraton G-1657 only was used to form a pressure-sensitive adhesive layer having a dynamic modulus of $9\times10^6$ dyne/cm$^2$ at 60° C.

EVALUATION TESTS

Each of the protective sheets obtained in the Examples and Comparative Examples was subjected to the following tests.

Adhesive remaining

The protective sheet was adhered at room temperature to a plate covered with an alkyd-melamine paint film having a glass transition point of 95° C. The resulting plate was placed in a chamber under high-temperature conditions, taken out therefrom, and then allowed to stand at room temperature for 3 hours. Subsequently, the protective sheet was stripped off the plate, and the plate was examined as to whether part of the pressure-sensitive adhesive had been remained on the plate surface especially around the area corresponding to the edge parts of the protective sheet.

In the above procedure, the high-temperature conditions were 80° C.×24 hours.

Paint film deformation

The alkyd-melamine paint film after the adhesive remaining test described above was visually examined as to whether a gap had been formed in the paint film especially around the area corresponding to the edge parts of the protective sheet. Gaps having a depth below 0.1 μm were regarded as none, while gaps having a depth of 0.1 μm or more were regarded as present; the FIGURE illustrates the depth (d) of a gap 21.

Initial adhesion strength The protective sheet was adhered to a plate covered with an alkyd-melamine paint film having a glass transition point of 95° C. by moving a 2 kg rubber roller forward and backward once on the protective sheet at a temperature as specified below. The resulting plate was allowed to stand for a period of time as specified below at the same temperature, and the protective sheet was then peeled to measure the adhesion strength (180° peeling; peeling rate, 300 mm/min).

The temperature and the time for allowing the plate to stand were 23° C. and 30 minutes.

Adhesion strength after exposure (Strippability)

The protective sheet was adhered to a plate covered with an alkyd-melamine paint film having a glass transition point of 95° C. by moving a 2 kg rubber roller forward and backward once on the protective sheet at a temperature as specified below. The resulting plate was exposed under conditions as specified below, subsequently allowed to stand at 23° C. for 30 minutes, and then examined for adhesion strength in the same manner as in the initial adhesion strength test above.

For Examples 1 to 6 and Comparative Examples 1 and 2, the temperature was 23° C. and the exposure was conducted by 100 hour irradiation in a sunshine weatherometer. For the remainder examples, the temperature was 23° C. and the exposure was conducted by 3 month outdoor weathering in Okinawa.

The results obtained are shown in the Table below.

TABLE 1

| | Adhesive remaining | Paint film deformation | Adhesion strength (g/20 mm) | |
| --- | --- | --- | --- | --- |
| | | | Initial | After exposure |
| Ex. 1 | None | None | 450 | 560 |
| Ex. 2 | None | None | 560 | 620 |
| Ex. 3 | None | None | 150 | 580 |
| Ex. 4 | None | None | 200 | 580 |
| Ex. 5 | None | None | 270 | 400 |
| Ex. 6 | None | None | 230 | 350 |
| Ex. 7 | None | None | 800 | 810 |
| Ex. 8 | None | None | 400 | 420 |
| Ex. 9 | None | None | 290 | 300 |
| Ex. 10 | None | None | 150 | 180 |
| Ex. 11 | None | None | 200 | 210 |
| Ex. 12 | None | None | 750 | 790 |
| Ex. 13 | None | None | 250 | 300 |
| Ex. 14 | None | None | 220 | 240 |
| Ex. 15 | None | None | 60 | 95 |
| Ex. 16 | None | None | 130 | 150 |

TABLE 1-continued

| | Adhesive remaining | Paint film deformation | Adhesion strength (g/20 mm) | |
| --- | --- | --- | --- | --- |
| | | | Initial | After exposure |
| Comp. Ex. 1 | Present | None | Cohesive failure | Measurement impossible |
| Comp. Ex. 2 | None | Present | 35 | 160 |

While the invention has been described in detail and with reference to specific embodiments thereof, it will be apparent to one skilled in the art that various changes and modifications can be made therein without departing from the spirit and scope thereof.

What is claimed is:

1. A sheet for protecting a melamine-alkyd, melamine-acrylic or urethane automotive paint film wherein said sheet comprises a plastic substrate having a thickness of 10 to 100 μm made of a polypropylene and polyethylene blend and having formed on one side thereof a layer of a rubber-based pressure-sensitive adhesive having a SP value of at least 1 larger or smaller than the automotive paint film, a dynamic modulus of from $4\times10^5$ to $7\times10_6$ dyne/cm$^2$ at 60° C., an adhesion strength of 100 to 1,000 g/20 mm and a thickness of 5 to 50 μm, said adhesive comprising an isobutylene-based polymer which is not curable, whereby said sheet has a ratio of (i) adhesion strength after exposure at 23° C. for 100 hours in a sunshine weatherometer to (ii) initial adhesion strength of 1.01 to 3.86.

2. A sheet as claimed in claim 1, wherein the rubber-based pressure-sensitive adhesive contains 0.005 to 0.5 part by weight of a silicone oil per 100 parts by weight of the rubber based pressure-sensitive adhesive.

3. A sheet as claimed in claim 2, wherein the silicone oil is dimethylpolysiloxane, methylphenylpolysiloxane, methylhydrogenpolysiloxane or modified products thereof.

4. A method for protecting an automobile paint film, which comprises covering a surface of the automobile paint film with a sheet for protecting an automobile paint film comprising a plastic substrate having a thickness of 10 to 100 μm made of a polypropylene and polyethylene blend and having formed on one side thereof a layer of a rubber-based pressure sensitive adhesive having a SP value of at least 1 larger or smaller than that of the automobile paint film, a dynamic modulus of from $4\times10^5$ to $7\times10^6$ dyne/cm$^2$ at 60° C. an adhesion strength of 100 to 1,000 g/20 mm and a thickness of 5 to 50 μmm, said adhesive composition comprising an isobutylene-based polymer which is not curable, whereby said sheet has a ratio of (i) adhesion strength after exposure at 23° C. for 100 hours in a sunshine weathermeter to (ii) initial adhesion strength of from 1.01 to 3.86.

* * * * *

UNITED STATES PATENT AND TRADEMARK OFFICE
CERTIFICATE OF CORRECTION

PATENT NO. : 5,747,132
DATED : May 5, 1998
INVENTOR(S) : Komaharu Matsui et al.

Page 1 of 1

It is certified that error appears in the above-identified patent and that said Letters Patent is hereby corrected as shown below:

Column 10,
Line 26 (claim 1, line 8), "$10_6$" should read as --$10^6$--;
Line 30 (claim 1, line 12), after "exposure", the phrase "at 23°C" has been deleted and the phrase --at 23°C-- has been inserted after "strength";
Line 32 (claim 1, line 14), --from-- has been inserted before "1.01";
Line 53, (claim 4, line 14), after "exposure", the phrase "at 23°C" has been deleted and the phrase --at 23°C-- has been inserted after "strength"; and
Line 54, (claim 4, line 15), "weathermeter" has been changed to --weatherometer--.

Signed and Sealed this

Third Day of July, 2001

*Attest:*

NICHOLAS P. GODICI
*Attesting Officer*   *Acting Director of the United States Patent and Trademark Office*

REEXAMINATION CERTIFICATE (4109th)

United States Patent [19]
Matsui et al.

[11] B1 5,747,132
[45] Certificate Issued: Jul. 4, 2000

[54] AUTOMOBILE PAINT FILM-PROTECTIVE SHEET

[75] Inventors: Komaharu Matsui; Mitrso Wakimoto; Takeshi Eda; Tadayoshi Tatsuno, all of Kanagawa; Yutaka Kuwabara; Kenichi Shibata, both of Osaka, all of Japan

[73] Assignees: Kansai Paint Co., Ltd., Amagasaki; Nitto Denko Corporation, Ibaraki, both of Japan

Reexamination Request:
No. 90/005,489, Sep. 10, 1999

Reexamination Certificate for:
Patent No.: 5,747,132
Issued: May 5, 1998
Appl. No.: 08/368,401
Filed: Jan. 3, 1995

Related U.S. Application Data

[63] Continuation of application No. 07/900,293, Jun. 18, 1992, abandoned.

[30] Foreign Application Priority Data

Jun. 19, 1991 [JP] Japan .................................. 3-174617
Oct. 18, 1991 [JP] Japan .................................. 3-299954
Oct. 18, 1991 [JP] Japan .................................. 3-299955
May 19, 1992 [JP] Japan .................................. 4-152717

[51] Int. Cl.$^7$ .................................................. B32B 7/06
[52] U.S. Cl. ....................... 428/41.7; 150/166; 156/344; 428/355 RA; 428/355 EN; 430/961
[58] Field of Search ........................... 428/41.7, 355 RA, 428/355 EN; 430/961; 156/344; 150/166

[56] References Cited

FOREIGN PATENT DOCUMENTS 48-37132  11/1973  Japan .
50-52141  5/1975  Japan .
59-135276  8/1984  Japan .

*Primary Examiner*—Blaine R. Copenheaver

[57] ABSTRACT

An automobile paint film-protective sheet comprising a substrate having formed on one side thereof a rubber-based pressure-sensitive adhesive having a dynamic modulus of from $2 \times 10^5$ to $7 \times 10^6$ dyne/cm$^2$ at 60° C.

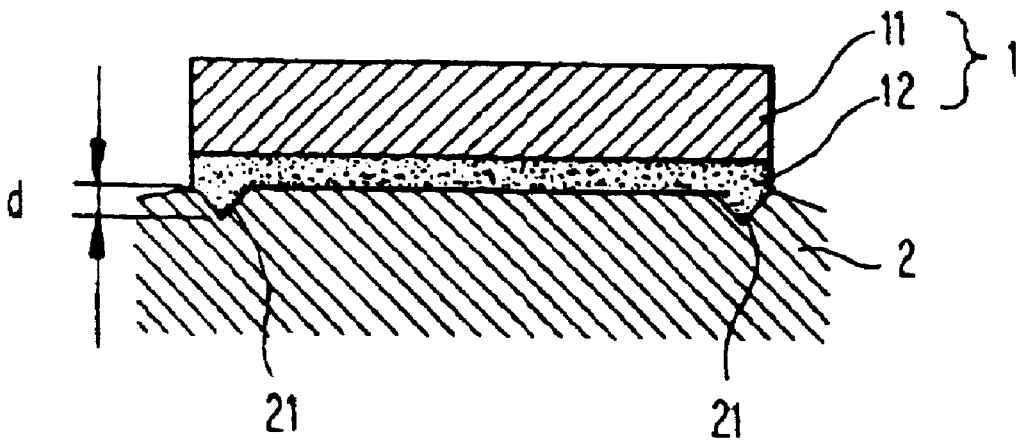

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4 is confirmed.

* * * * *